(12) United States Patent
Lindqvist et al.

(10) Patent No.: US 6,856,118 B1
(45) Date of Patent: Feb. 15, 2005

(54) METHOD AND DEVICE FOR BATTERIES

(75) Inventors: Frank Lindqvist, Reilingen (DE);
Henrik Lindqvist, Amal (SE)

(73) Assignee: Holgia AB, Arvika (SE)

( * ) Notice: Subject to any disclaimer, the term of this patent is extended or adjusted under 35 U.S.C. 154(b) by 0 days.

(21) Appl. No.: 10/009,302

(22) PCT Filed: May 24, 2000

(86) PCT No.: PCT/SE00/01049

§ 371 (c)(1),
(2), (4) Date: Aug. 13, 2002

(87) PCT Pub. No.: WO00/77911

PCT Pub. Date: Dec. 21, 2000

(30) Foreign Application Priority Data

Jun. 15, 1999 (SE) .............................................. 9902286

(51) Int. Cl.[7] .............................. H02J 7/06; H02J 7/00; H02J 7/04
(52) U.S. Cl. ........................ 320/147; 320/130; 320/139
(58) Field of Search ................................. 320/147, 130, 320/139, 133, 134, 135, 143, 144, 150–153

(56) References Cited

U.S. PATENT DOCUMENTS

| 4,650,729 | A |   | 3/1987  | Nakamura et al. |           |
|-----------|---|---|---------|-----------------|-----------|
| 4,871,959 | A | * | 10/1989 | Gali            | 320/101   |
| 5,648,714 | A | * | 7/1997  | Eryou et al.    | 320/139   |
| RE35,643  | E | * | 10/1997 | Gali            | 320/119   |
| 5,701,069 | A | * | 12/1997 | Wihk            | 320/130   |

FOREIGN PATENT DOCUMENTS

| DE | 196 29 569 A1 | 1/1998  |
|----|---------------|---------|
| EP | 0 293 664 A2  | 12/1988 |
| WO | WO 94/28610   | 12/1994 |
| WO | WO 96/17426   | 6/1996  |

OTHER PUBLICATIONS

COBATEC AB, Protest under 37 CFR 1.291 (a), Mar. 29, 2004, 93 pages.*

* cited by examiner

Primary Examiner—Pia Tibbits
(74) Attorney, Agent, or Firm—Jeffrey S. Melcher; Manelli Denison & Selter, PLLC

(57) ABSTRACT

Method for treatment, in the form of regeneration, of accumulators having at least one cell, preferably lead batteries, in which a varying direct voltage from a charging unit is applied in intermittent current supply periods, which are interrupted by current free pauses, the direct voltage being sufficient to generate gas in the accumulator. During the treatment process, process data is registered, for at least one cell in the accumulator, which process data is used in order to control the treatment process.

41 Claims, 2 Drawing Sheets

METHOD AND DEVICE FOR BATTERIES

TECHNICAL FIELD

The present invention relates to a method and device for treatment, in the form of regeneration, of accumulators having at least one cell, preferably lead batteries, in which a varying direct voltage from a charging unit, is applied in intermittent current supply periods which are interrupted by current free pauses, the direct voltage being sufficient to generate gas in the accumulator.

THE TECHNICAL STANDPOINT

In a charged lead accumulator, i.e. a lead battery, the active substance in the positive electrodes consists of lead superoxide, $PbO_2$, and of porous metallic lead in the negative electrodes. When the battery is discharged, these active substances are converted to lead sulphate, $PbSO_4$, sulphate ions being taken from the electrolyte, which is sulphuric acid. In principle the process is the reversed at charging. Conventionally, when being recharged by a continuous direct current, lead accumulators have, however, a limited ability of being recharged. The reason for this is not completely investigated, but it is supposed that influence is made by factors such as the products of discharge having a limited solubility in the electrolyte, it being considered that diffusion of the divalent lead ions constitutes the limiting factor both at discharging and recharging. Furthermore, lead sulphate is a very poor conductor of electricity. All these circumstances often result in problems in connection with the charging of lead batteries, which i.a. risks being destroyed by inactive layers of lead sulphate which hinders the charging or decreases the capacity, and which eventually makes the battery useless. In addition, there are problems in the form of different densities before and after the charging, which leads to the formation of sludge and to a decreased strength.

In WO 94/28610, there is presented a solution to the above problems in connection with the charging of accumulators, especially lead batteries. According to this document, lead batteries may thus be charged by high current levels with a very good result and without a noticeable increase in temperature, when a direct voltage is being applied on the battery in intermittent current supply periods, interrupted by pauses in which no current is supplied, which periods are between about 0.5 seconds and about 10 seconds. The battery may be charged from a discharged state, in which case the current supply intervals and the pause intervals are of approximately the same length, preferably between 0.5 and 1.5 seconds, one example presenting a current strength of 90 A being used, but it may also be maintenance charged by current supply periods of 0.5 seconds at the most, the intervals there between being longer, e.g. 10 seconds or more, at lower current levels. The process is especially directed towards a fast process for charging.

One problem with the technique which is described in WO 94/28610 is that the method not is adapted to every single battery which is to be recharged. Neither is it possible to control the charging process, other than by setting base parameters for every charging that is done, in which setting there is made a choice as to whether the process is to constitute a charging of a discharged battery, or a maintenance charging of a non discharged battery. Neither is the method adjustable in consideration to experiences from chargings which have been previously performed, not is it directed upon regeneration.

In U.S. Pat. No. 1,743,594 there is described another, older method of charging batteries in the shortest possible time, which accordingly does not aim at performing a regeneration of the battery. Thereby, the charging takes place by pulses of up to 100 A current strength during periods of 1.5–2 seconds, with pauses of the same length them between.

In U.S. Pat. No. 3,963,976 there is described yet another method for charging batteries, which is not adapted to performing a regeneration of the same. The object of the method is to achieve a mixing through of the electrolyte by the circulation which takes place in connection with the formation of gas. In the document, it is stated that current strengths of up to 1500 A may be used, but at the same time it is warned that pulse periods of greater length may be harmful. It is in this connection stated that the pulse period may be 0.5–50 milliseconds, whereby the peak of the current strength only lasts about one millisecond. Furthermore, it is stated that the pulses should be generated at the same time as a constant charging takes place, it being recommended that the pulse treatment takes place at the end of the charging, i.e. when the battery is almost fully charged.

In WO 96/17426 there is described a system for charging of lead batteries, in which weak current pulses are used, mixed with extremely short current supply pulses, "current spikes", of relatively low current strengths. When the cell voltage reaches a level when generation of gas commences, the charging shifts to a constant voltage charging until the battery is fully charged. The controlling of the device makes use of a micro processor and is based upon measurements of the cell voltage and the internal resistance.

One problem which is not solved by any of the just mentioned methods is how to perform a regeneration of worn batteries in a way that can be optimised and controlled for each given battery. Instead, the mentioned methods aims at achieving a fast and optimised charging or maintenance charging of more conventional type.

DESCRIPTION OF THE INVENTION

One object of the present invention is accordingly to offer a method for treatment, in the form of regeneration, of accumulators, the treatment process being controlled, in terms of current supply period, pauses and current strength, based on given input data. As input data, there is thereby used process data which are registered cell by cell during the treatment process, preferably at least the temperature and the conductivity of the electrolyte in the accumulator. Additional input data for the controlling of the treatment process are general data for the accumulator/battery, which general data are being fed in at the start of the treatment process. The controlling of the treatment process is preferably performed automatically, by hardware and software which is adapted for the process, preferably by use of a microcomputer or the like. For the controlling there may also be used process data from earlier treatment processes, such earlier process data constituting experience data which is used in order to optimise the treatment process taking place.

A basic object of the method and device according to the invention, is to achieve a regeneration of batteries which is non destructive to the battery. The treatment process should moreover be adaptable and controllable for every single battery.

Accordingly, there is according to the invention introduced a method for treatment of accumulators according to claim 1.

By the ability to absorb current/the conductivity being determined for at least one cell in the battery during the treatment process, the treatment process can be controlled by aid of a control unit, preferably e.g. a microcomputer, based on measured process data, preferably at least in the form of measured temperature and conductivity. The measuring of process data and the controlling based on these process data may be performed individually for all or essentially all cells in the accumulator. An alternative, preferred form of surveillance is to measure the total current which runs to the accumulator during the current supply period. This is done by surveillance of the mean value of temperature and conductivity, during a number of current supply periods, e.g. ten periods. When the mean value of the subsequent current supply periods remains in the main constant, e.g. within a limit of typically about 5%, for a longer period, e.g. about 1000 current supply periods, this means that maximum/ optimum regeneration is achieved with the parameters as set.

At the treatment process, a direct voltage is applied, usually a half-wave rectified alternating voltage from a common charging unit, in intermittent current supply periods, interrupted by current free pauses, which current supply periods have a duration of between 0.01 and 10 seconds, preferably between 0.01 and 0.4 seconds, and even more preferred between 0.1 and 0.5 seconds. Most preferred, a lowermost limit for the length of the current supply periods is 0.1 seconds, preferably 0.15 seconds, and an uppermost limit is 0.5 seconds, preferably 0.4 seconds and even more preferred 0.25 seconds. It has been shown in experimental tests that a very advantageous current supply period is 0.18 seconds. At the treatment, it is suitable to make the time periods for current supply and pause of unequal length, whereby the pauses are longer than the current supply periods, the pauses typically having a length of 1–20 seconds, preferably 1–10 seconds and even more preferred 1–5 seconds, typically about 3 seconds, it however being possible to vary them individually by controlling the process according to the present invention. The shortest pauses within the ranges are used in connection with the shortest current supply within the ranges, and vice versa. Thanks to the pauses being considerably longer than the current supply periods, there is also attained the advantage that the accumulator doesn't get to warm during the treatment. The current strength used in the current supply periods is 80–300 A or even more preferred up to 1000 A, at least in the case of so called traction batteries, the highest values being related to the accumulator being in a relatively good shape, and the lowest values to the same being in a bad shape. Most preferably, current strengths of at least 110 A, preferably at least 200 A and even more preferred at least 250 A, are used for these kind of traction batteries. For smaller batteries, e.g. batteries for passenger cars, there is on the contrary used lower current strengths, normally below 150 A, preferably below 110 A, but not lower than 80 A When the regeneration process according to the invention is commenced, the accumulator should not be entirely discharged but not fully charged either. Instead, it should suitably be partially charged, e.g. about half-way charged. Maintenance charging should be performed by constant, i.e. continuous charging.

At the treatment process according to the invention, contaminants in the form of sulphate crystals on the electrodes, which contaminants have been built up during discharge, are removed. By the very short current periods, of only some tenths of a second, with a high current, which are mixed with pauses of considerably greater length, there is achieved an explode- or chock-like effect, whereby the crystals present in the battery acid are disintegrated, and pure lead is separated, which is returned to the electrodes (the lead plates) at the recharging of the battery. In order to achieve an optimum effect, each cell in the accumulator should reach a voltage of at least 2,5 V during the current supply periods, which is assured by the above mentioned current strengths and pulse times. Thereby, the energy supply during the current supply periods is higher than for the known methods, the object of which is only charging and not regeneration, but seen as a total, the energy supply is relatively low, thanks to the relatively long pauses. As a total, pulsing at 300 A e.g., corresponds to a charging current of about 20 A.

According to the invention, the treatment process is performed as a regeneration process, whereby a certain, but normally not complete, charging of the accumulator takes place at the same time as the regeneration, as a side effect of the treatment. After the regeneration, there is suitably performed a discharge of the accumulator, followed by a charging. This charging too may be performed by aid of a method which corresponds to the method according to the invention, the process however being controlled in a way which is optimal for the charging. It is however preferred that the charging takes place with a constant, i.e. continuous, current supply after the regeneration. According to an especially preferred embodiment, the treatment process is performed in a number of cycles, preferably 5–30, and even more preferred 5–20 cycles for traction batteries. In this case, each cycle consists of a regeneration part, typically having current supply periods of about 0.18 seconds, and pauses of about 3 seconds, and a charging part with standard charging, i.e. with continuous current supply of typically 2,34 V. Thereby, each regeneration part lasts for 2–8 hours, preferably 26 hours and most preferred about 6 hours, the constant charging parts lasting for 0.5–2 hours, preferably about 1 hour. Without binding the invention to a certain theory, it is thereby considered that the constant charging acts in the form of a formatting of the electrode surfaces, in a way that corresponds to what takes place at the charging of an entirely new battery. Hereby, a maximum surface with an amorphous structure is achieved on the electrodes. It is realised that the treatment process for the regeneration is relatively long, and it is moreover not an object per se that the process should be shortened in relation to known processes for the charging of batteries. Typically, the treatment time according to the invention is at least 12 hours long, preferably at least 24 hours long, even more preferred 48 hours long and up to several days long. As an alternative, regeneration and charging may be performed at the same time by the method according to the invention, during total treatment times of the same length.

According to one aspect of the invention, process data is registered continuously during the entire or essentially the entire treatment process, the controlling of the treatment process too being performed continuously. Preferably, the pulse length/current supply periods, the pauses and optionally the current strength are arranged to be adjusted/ controlled dynamically during the course of the treatment process. A control unit is used at the dynamic adjusting/ controlling, preferably a micro-controller, which makes use of a table of experience values, which is stored in its memory, in order to adapt current supply and pause lengths in the regeneration part of the treatment process. The maximum amplitude of the current supply periods may also be limited, with consideration to general data for the accumulator. Thereby, the amplitude should not exceed the maximum allowed charging current for the accumulator. The controlling takes place entirely by aid of the microcontroller, which controls e.g. a triac etc., partially via a D/A-converter.

According to another aspect of the invention, the registering of process data takes place during a predetermined time period of the entire treatment time, preferably during start-up of the treatment. During the start-up of the treatment, there is also an opportunity to detect cells in the accumulator which are damaged, which damaged cells behave in a non normal way, e.g. by exhibiting very high voltages at the treatment.

According to yet another aspect of the invention, process data, at least in the form of temperature and conductivity, is registered by sensors adapted therefore. This may be performed by the accumulator being opened, so that the sensor may be introduced down into the electrolyte in each cell where process data is to be registered. As an alternative, the measuring/registering may take place from the outside, by external registering of temperature and conductivity, e.g. by inductive measuring. The cells of the accumulator may thereby be provided with stationary sensors, which inductively communicates through the battery housing by e.g. RFID technique.

The temperature sensors may be standard analogous temperature transmitters which are, e.g., connected to PT100 input in the electronics. Of course, digital transmitters are conceivable too. The measurement of conductivity preferably takes place by two electrodes, preferably of platinum, and therefore adapted electronics which measures the conductivity of the electrolyte during the pauses in the treatment process. Other sensors, adapted to the purpose, may be used too.

According to yet another aspect of the invention, the general data for the battery, which are used as input data for controlling of the treatment process, are constituted by any, some or all input data in the group consisting of name of the customer, date, battery manufacturer, type number for the battery, type values for the battery, year of manufacture, time of the first operational use of the battery, time between each previously performed treatment, type of vehicle in which the battery is used and data registered in previous treatments, e.g. cell voltage and electrolyte density. These general data, or at least a main pat of them, may be stored in a data storing unit attached to the battery, e.g. a chips, a bar code, or in a data bank in the device for the treatment, or similar.

According to yet another aspect of the invention, the treatment of a certain battery is performed when the conductivity which is determined at a certain cell voltage for this specific battery has reached a predetermined critical value.

According to another aspect of the invention, several devices for treatment of accumulators may share the same old process data from previous treatment sessions, by being connected to each other in a network. Hereby, a single server, in the network, may contain a database which is common for the devices, having experience values from previous treatment processes. Thus, there may be used experiences/process data from previous treatments of batteries of the same or similar type in other treatment devices which also are connected to the network, for controlling the treatment of a certain battery in a first treatment device, which is connected to the network. The control units of the batteries may be connected to the network by GSM and/or local radio/telemetric communication systems, such as dect, blue tooth etc., or corresponding systems. By the network and the common server, it is also possible to remotely survey the devices and to upgrade the software of their control units.

Since every accumulator behaves individually, which strongly depends on its history, i.e. the treatment and environmental influence which it has been exposed to, the optimal treatment method for different accumulators varies. By putting together a database, according to the above, which contains essential parameters for each treated accumulator, before, during and after previously performed regenerations in combination with the type of the accumulator, there may be put together an algorithm (e.g. in the form of an equation or matrix), in order to achieve the best possible treatment process for each new treatment of an accumulator. From a commercial point of view, it may thereby be of extra importance to be able to predict the expected treatment time. Such a database may be built by combining the data which has been collected from the greatest possible number of regenerating machines. This may be done by these data being manually combined and distributed, which however is practically difficult why the best solution is to connect the machines in a network, permanently or temporarily. Thereby, there may be used a classic Server-Client network (LAN), or the Internet, in order to in a simple way achieve a global network.

DETAILED DESCRIPTION OF THE INVENTIONS

Figure 1:
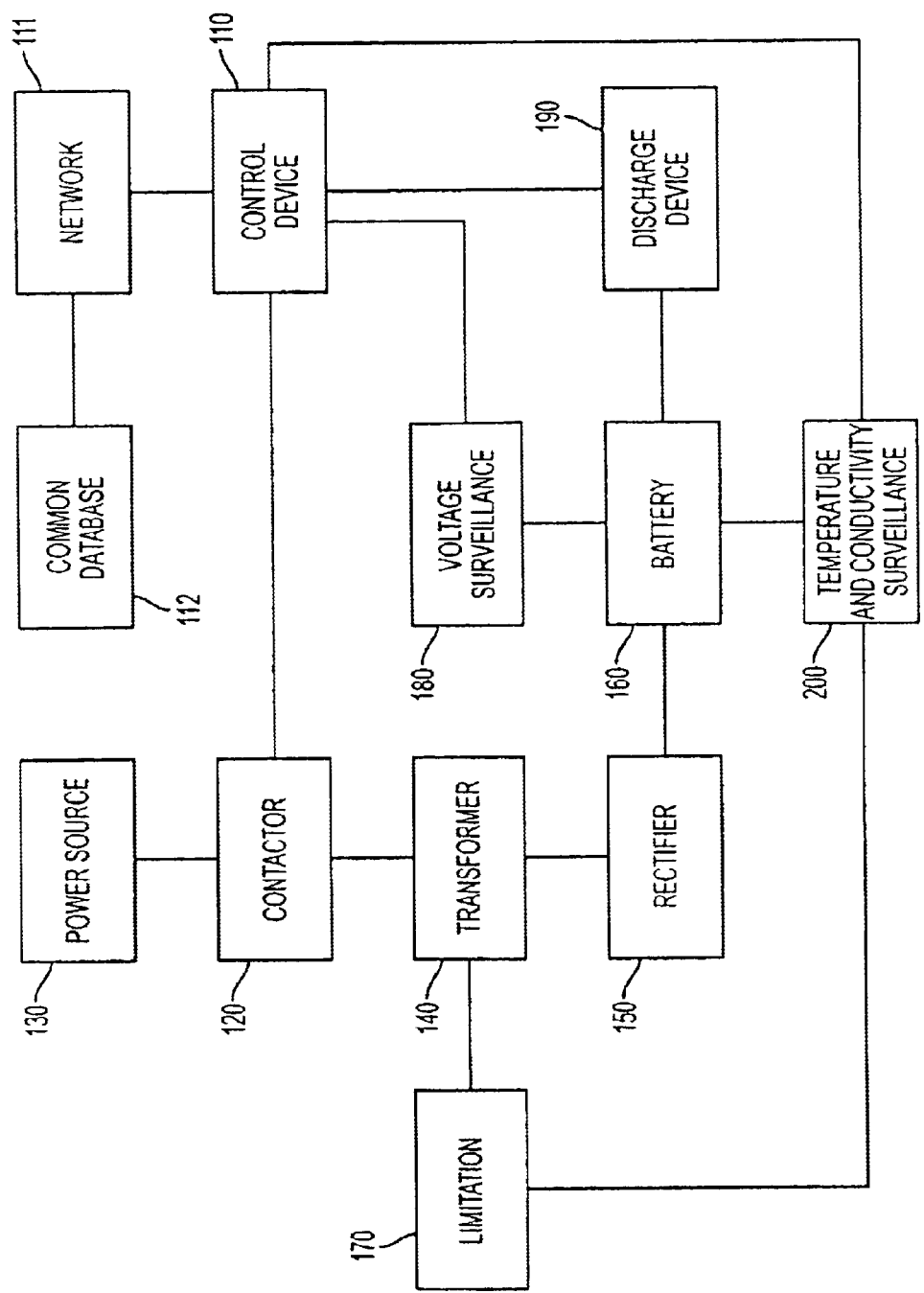
FIG. 1 illustrates a block diagram of the device.
Figure 2:
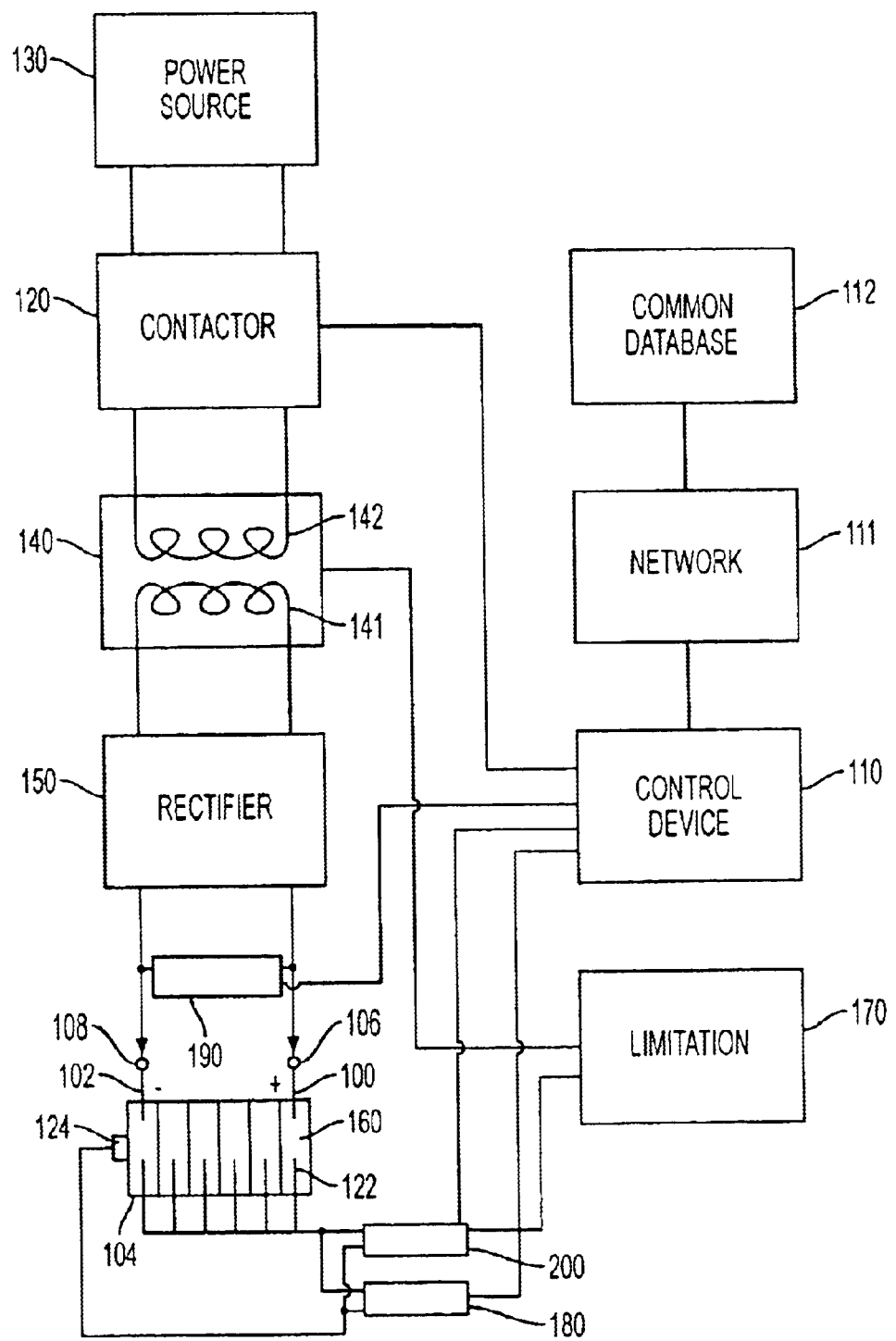
FIG. 2 illustrates a view of the device connected to a battery.

In the following, a device according to the invention, for the performance of the method according to the invention, will be described, while referring to FIG. 1, which is a block diagram and FIG. 2, which is a view of the device attached to a common 12 volt battery having 6 cells.

The auto monitor control is achieved by a control unit 110, for example a suitably programmed microprocessor and its surrounding circuits, which controls a switch means, such as a contactor 120. This is breaking and closing a feed path for electrical energy, which is supplied by a voltage source 130, e.g. the common electricity supply network. The voltage is transformed into a desired value by means of a transformer 140 having a primary coil 142 and a secondary coil 141, where after it is supplied to a rectifier 150. Thereafter, the rectified voltage is supplied to the battery 160 using positive cable clip 106 and negative cable clip 108, as a treatment voltage.

A limitation circuit 170 acts as an auto monitor control of current and temperature. If the feed current or the battery temperature, which are surveyed by the temperature and conductivity surveillance 200, becomes too high, the rectifier 150, and thereby the feed to the battery 160, is deactivated.

The control unit 110 controls the contactor 120 based on registered process data, which process data are registered by means of the temperature and conductivity surveillance 200 and a voltage surveillance circuit 180. The control unit 110 also makes use of general data for the specific battery, for the control, as well as older process data and general data, which are stored in a common database 112 that is available to the control unit via a network connection 111. Moreover, the control unit 110 controls a discharge circuit 190, by which the battery can be discharged at a predetermined current.

According to another aspect of the invention, process data, at least in the form of temperature and conductivity, is registered by sensors 122 adapted therefore. This may be performed by the battery 160 being opened, so that a sensor 122 may be introduced down into the electrolyte in each cell 104 where process data is to be registered. As an alternative, the measuring/registering may take place from the outside, by external registering of temperature and conductivity, e.g. by inductive measuring. The cells of the accumulator may thereby be provided with stationary sensors 124 (only shown attached to the side of one cell), which inductively communicates through the battery housing by e.g. RFID technique. The sensors 122 and 124, temperature and conductivity surveillance 200, and voltage surveillance 180 are examples of means for registering and measuring process data.

The invention is not limited by the above described embodiments, but may be varied within the scope of the claims. The device and method according to the invention is e.g. also suitable for other types of accumulators than lead batteries, e.g. nickel-cadmium and nickel-iron accumulators.

What is claimed is:

1. Method for treatment of accumulators having at least one cell comprising the steps of:

applying a varying direct current from a charging unit to at least one cell of an accumulator in intermittent current supply periods having a length of between 0.01 and 0.5 seconds and a current level during said current supply periods amounting to between 80 and 1000 A that is sufficient to generate gas in the accumulator and strong enough for the at least one cell to reach a voltage of at least 2.5 V during the current supply periods;

interrupting the intermittent current supply periods with current free pauses having a length of 1 to 20 seconds;

registering process data for at least one cell in the accumulator during the treatment process; and controlling the treatment process with said process data.

2. Method according to claim 1, wherein at least one of a conductivity in an electrolyte in the cell and a temperature in the electrolyte in the cell comprises said process data.

3. Method according to claim 1, wherein sensors for said process data are introduced down into the electrolyte in each cell where process data is to be registered.

4. Method according to claim 1, wherein what is controlled during the treatment process is a length of said current supply periods, which may be between 0.01 and 0.5 seconds, a length of said pauses, which may be between 1–20 seconds, and the current supply periods being shorter than the pauses.

5. Method according to claim 1, wherein said current level during said current supply periods amounts to at least 110 A and 1000 A at the most.

6. Method according to claim 1, wherein the current level during said current supply periods is 150 A at the most.

7. Method according to claim 1, wherein the treatment process is performed in a number of cycles, each cycle comprising a regeneration part of 2–8 hours, and a charge part.

8. Method according to claim 1, wherein said registering of process data and said controlling, is continuously performed during the entire or substantially the entire treatment process.

9. Method according to claim 1, wherein said registering of process data is performed during a predetermined time period of the entire treatment period.

10. Method according to claim 1, wherein said registering of process data and controlling based on this process data, is individually performed for all or substantially all cells in the accumulator.

11. Method according to claim 1, wherein the total current supplying the accumulator during the current supply periods is registered by surveying of a mean value for said process data for a small number of current supply periods, optimal control, and thereby optimal treatment, thereafter being ensured when the mean value of the succeeding current supply periods, remains mainly constant.

12. Method according to claim 1, wherein general data, for each individual accumulator, is used for the controlling of the treatment process, which general data is chosen from the group consisting of name of the customer, date, accumulator manufacturer, type number for the accumulator, type values for the accumulator, year of manufacture, time of the first operational use of the accumulator, time between previously performed treatments, and type of device in which the accumulator is used.

13. Method according to claim 12, wherein older general data and process data too, for at least one of other accumulators and previous treatments of the accumulator, are used for the controlling of the treatment process.

14. Method according to claim 13, wherein access to said older general data and older process data is ensured by connection to a network having a common database for these data for different charging units for the treatment of accumulators.

15. Method according to claim 14, wherein said network also is arranged to be used for at least one of the surveillance of the treatment process and the upgrading of software for the treatment process.

16. Device for treatment of accumulators having at least one cell, which device comprises:

a transformer having a primary coil adapted to be connected to a power supply and a secondary coil in communication with the primary coil, a rectifier connected to the secondary coil, a positive cable clip and a negative cable clip in communication with the rectifier and adapted to be connected to an accumulator which is to be treated, a contactor constructed and arranged for intermittent connecting and disconnecting of the electricity supply network with short current supply periods interrupted by current free pauses, wherein said device being arranged to conduct said current supply periods having a length of between 0.01 and 0.5 seconds, a current level during said current supply periods being arranged to amount to between 80 and 1000 A which is strong enough for a cell in the accumulator to be brought to a voltage of at least 2.5 V during the current supply periods, and to conduct said pauses with a length of 1–20 seconds, means for registering and measuring of process data of at least one cell of the accumulator, and means for controlling the treatment process based on this process data.

17. Device according to claim 16, wherein sensors for registering and measuring a conductivity in an electrolyte in the cell, comprises at least one of said means for registering and measuring process data and sensors for registering and measuring a temperature in the electrolyte in the cell.

18. Device according to claim 16, wherein said means for registering and measuring process data are arranged to individually register and measure process data in all or substantially all cells of the accumulator.

19. Device according to claim 16, wherein said means for controlling the treatment process comprises a control unit and means for, during the treatment process, altering the length of said current supply periods to between 0.01 and 0.5 seconds, a length of said pauses, which may be between 1–20 seconds, and the current supply periods being shorter than the pauses.

20. Device according to claim 16, wherein the current level during said current supply periods is at least 110 A.

21. Device according to claim 16, wherein the current level during said current supply periods is 150 A at the most.

22. Device according to claim 16, wherein said means for the registering and measuring data is chosen from the group consisting of name of the customer, date, accumulator manufacturer, type number for the accumulator, type values for the accumulator, year of manufacture, time of the first operational use of the accumulator, time between previously performed treatments, and type of device in which the accumulator is used.

23. Device according to claim 22, wherein said device comprises means for connecting it to a database via a network for use of older general data and process data for previous treatment processes, for at least one of other accumulators and previous treatments of the accumulator, in the controlling of the treatment process.

24. Device according to claim 23, wherein said network also is arranged to be used for at least one of the surveillance of the treatment process and the upgrading of software for the treatment process.

25. Method according to claim 1, wherein said accumulator is a lead acid battery.

26. Method according to claim 4, wherein the length of said current supply periods is from 0.1–0.5 seconds and the length of said pauses is from 1–10 seconds.

27. Method according to claim 4, wherein the length of said current supply periods is from 0.15 to 0.5 seconds and the length of said pauses is from 1–5 seconds.

28. Method according to claim 4, wherein the length of said current supply periods is from 0.1 to 0.4 seconds and the length of said pauses is 1–5 seconds.

29. Method according to claim 5, wherein said current level during said current supply periods amounts to at least 200 A and 1000 A at the most.

30. Method according to claim 5, wherein said current level during said current supply periods amounts to at least 250 A and 1000 A at the most.

31. Method according to claim 6, wherein a current level during said current supply periods is 110 A at the most.

32. Method according to claim 7, wherein the treatment process is performed in 5 to 30 cycles, each cycle comprising a regeneration part of 2 to 6 hours and a charge part using a continuous current supply.

33. Method according to claim 32, wherein the charge part is conducted from 0.5 to 2 hours.

34. Method according to claim 32, wherein the charge part is conducted for about 1 hour.

35. Method according to claim 32, wherein the treatment process is performed in 5 to 20 cycles.

36. Method according to claim 9, wherein said registering of process data is performed during start up of the treatment.

37. Method according to claim 12, wherein the general data is registered automatically at start up of the treatment process.

38. Device according to claim 17, wherein said registering and measuring is arranged to be performed by opening of the accumulator and applying said sensors.

39. Device according to claim 19, wherein said means for controlling the treatment process comprises a microcomputer.

40. Device according to claim 22, further comprising a means for registering and measuring data for each individual accumulator.

41. Device according to claim 16, wherein said contactor is connected to said primary coil.

* * * * *